(12) United States Patent
Xu et al.

(10) Patent No.: US 12,315,965 B2
(45) Date of Patent: May 27, 2025

(54) BATTERY CELL, BATTERY AND POWER CONSUMPTION APPARATUS

(71) Applicant: CONTEMPORARY AMPEREX TECHNOLOGY (HONG KONG) LIMITED, Hong Kong (CN)

(72) Inventors: Xiaofu Xu, Ningde (CN); Yonghuang Ye, Ningde (CN); Qian Liu, Ningde (CN); Jianfu He, Ningde (CN); Xueyang Sun, Ningde (CN); Jingxuan Sun, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 300 days.

(21) Appl. No.: 17/980,591

(22) Filed: Nov. 4, 2022

(65) Prior Publication Data
US 2023/0046770 A1  Feb. 16, 2023

Related U.S. Application Data

(63) Continuation of application No. PCT/CN2021/106111, filed on Jul. 13, 2021.

(51) Int. Cl.
*H01M 50/609* (2021.01)
*H01M 50/102* (2021.01)
(Continued)

(52) U.S. Cl.
CPC ....... *H01M 50/609* (2021.01); *H01M 50/102* (2021.01); *H01M 50/204* (2021.01);
(Continued)

(58) Field of Classification Search
None
See application file for complete search history.

(56) References Cited

U.S. PATENT DOCUMENTS

| 10,205,137 B2 | 2/2019 | Uhm et al. |
| 2009/0202891 A1 | 8/2009 | Morganstein |

(Continued)

FOREIGN PATENT DOCUMENTS

| CN | 105229823 A | 1/2016 | |
| CN | 106654355 | * 5/2017 | ........ H01M 10/0525 |

(Continued)

OTHER PUBLICATIONS

Supplementary European Search Report mailed Sep. 28, 2023, in European Application No. 21923588.4, 9 pages.

(Continued)

*Primary Examiner* — Amanda J Barrow
(74) *Attorney, Agent, or Firm* — XSENSUS LLP

(57) ABSTRACT

The present application discloses a battery cell, a battery and a power consumption apparatus. The battery cell may include: a housing filled with an electrolyte inside; at least one core assembly arranged in the housing and at least one closed liquid bladder holding another electrolyte, the liquid bladder being arranged in the housing, and at least being provided corresponding to a side wall of the core assembly; at least one weakened structure being provided on the liquid bladder. Under a condition that a pressure in the liquid bladder reaches a threshold value, the another electrolyte in the liquid bladder may break through the weakened structure and flow out of the liquid bladder.

16 Claims, 8 Drawing Sheets

(51) Int. Cl.
  *H01M 50/204* (2021.01)
  *H01M 50/673* (2021.01)
  *H01M 10/0525* (2010.01)

(52) U.S. Cl.
  CPC ...... *H01M 50/673* (2021.01); *H01M 10/0525* (2013.01); *H01M 2220/20* (2013.01)

(56) References Cited

U.S. PATENT DOCUMENTS

| | | | |
|---|---|---|---|
| 2014/0154554 A1 | 6/2014 | Kim et al. | |
| 2015/0093635 A1* | 4/2015 | Grimminger | H01M 10/0567 |
| | | | 429/188 |
| 2016/0141565 A1 | 5/2016 | Uhm et al. | |
| 2020/0106123 A1 | 4/2020 | Hu | |

FOREIGN PATENT DOCUMENTS

| | | | | |
|---|---|---|---|---|
| CN | 106654355 A | | 5/2017 | |
| CN | 109309257 A | | 2/2019 | |
| CN | 110048154 | * | 5/2019 | ........ H01M 10/0525 |
| CN | 110048154 A | | 7/2019 | |
| FR | 1267255 | * | 7/1961 | ............ H01M 10/50 |
| JP | 2012129009 A | | 7/2012 | |
| JP | 2021508141 A | | 2/2021 | |
| JP | 2022101084 A | | 7/2022 | |
| KR | 20080110679 A | | 12/2008 | |
| KR | 20130038655 A | | 4/2013 | |
| KR | 20130106796 A | | 9/2013 | |
| KR | 20210079084 A | | 6/2021 | |

OTHER PUBLICATIONS

Notice of Reasons for Refusal mailed Oct. 2, 2023, in Japanese Application No. 2022-550830, 9 pages.

International Search Report and Written Opinion mailed on Mar. 1, 2022, received for PCT Application PCT/CN2021/106111, filed on Jul. 13, 2021, 19 pages including English Translation.

Office Action issued Jan. 15, 2025 in Korean Patent Application No. 10-2022-7028980 with English translation thereof.

* cited by examiner

BATTERY CELL, BATTERY AND POWER CONSUMPTION APPARATUS

CROSS-REFERENCE TO RELATED APPLICATION

The present application is a continuation of International Application No. PCT/CN2021/106111, filed Jul. 13, 2021, the entire content of which is incorporated herein by reference in its entirety.

TECHNICAL FIELD

The present application relates to the field of battery, and in particular, to a battery cell, a battery and a power consumption apparatus.

BACKGROUND

Energy conservation and emission reduction are the key to the sustainable development of the automotive industry. Electric vehicles have become an important part of the sustainable development of the automotive industry due to their advantages of energy conservation and environmental protection. For the electric vehicles, the battery technology is also an important factor for their development.

During the use of a battery by charging and discharging the battery, considering a bulging of a battery core, a low group margin design is adopted, which brings a risk of lithium precipitation. In addition, with a charge-discharge cycle of the battery, an electrolyte is continuously consumed or even a local electrolyte depletion may occur, which further leads to the deterioration of battery performance and affects the life of the battery and may bring security risks.

SUMMARY

In view of the above problems, the present application provides a battery cell, a battery and a power consumption apparatus, which may alleviate a deterioration of battery performance caused by a lithium precipitation of the battery or a local electrolyte depletion during the use of the battery.

In a first aspect, the present application provides a battery cell, including: a housing filled with an electrolyte inside; at least one core assembly arranged in the housing; and at least one closed liquid bladder being arranged in the housing and at least being provided corresponding to a side wall of the core assembly, the liquid bladder holding an another electrolyte; at least one weakened structure being provided on the liquid bladder, when a pressure in the liquid bladder reaching a threshold value, the another electrolyte in the liquid bladder breaking through the weakened structure and flowing out of the liquid bladder.

In the technical solutions of the embodiments of the present application, the liquid bladder is provided in the housing of the battery cell, and the liquid bladder is provided at least corresponding to the side wall of the core assembly. Such a design enables the liquid bladder to occupy an empty space in a battery housing at an initial stage of battery use, overcomes a problem of wrinkling of a battery core in the battery with a low group margin design, so as to avoid the problem of electrode lithium precipitation; as a charge-discharge cycle of the battery goes on, when the battery core expands, the side wall of the battery core will extrude the liquid bladder, causing the liquid bladder to deform and fill an empty area in the battery housing to relieve an expansion pressure of the battery core; as an expansion force of the battery core further increases, when the side wall of the core assembly further extrudes the liquid bladder so that the pressure in the liquid bladder reaches the threshold value, the another electrolyte in the liquid bladder will break through the weakened structure provided on the liquid bladder and flow out of the liquid bladder, realizing an automatic replenishment of the another electrolyte in the housing.

In some embodiments, the side wall includes a middle side wall portion located in a middle area of two end portions of the core assembly, and the liquid bladder is provided corresponding to the middle side wall portion. By providing the liquid bladder to correspond to the middle side wall portion of the core assembly, the expansion pressure in the middle portion of the core assembly may be relieved, so as to more effectively relieve the deformation of the battery housing caused by the expansion force of the battery core during the use of the battery.

In some embodiments, the liquid bladder is provided between the core assembly and the side wall of the housing, and/or, the liquid bladder is provided between the adjacent battery core assemblies. In the battery cell of the embodiment of the present application, the arrangement manner of the liquid bladder in the housing is flexible, as long as one side of the liquid bladder is in contact with the side wall of the core assembly.

In some embodiments, at least one weakened structure is provided at at least part of an edge of the liquid bladder. Such a design enables the another electrolyte in the liquid bladder to flow out from the edge of the liquid bladder, so as to facilitate the replenishment of the electrolyte consumption in the housing from a gap of the side wall of the core assembly.

In some embodiments, a plurality of the weakened structures are spaced apart at at least part of the edge of the liquid bladder. By providing the plurality of weakened structures spaced apart at at least part of the edges of the liquid bladder, the another electrolyte may flow out of the liquid bladder dispersedly from the plurality of weakened structures, so as to realize the effect of dispersion and slow release.

In some embodiments, the battery cell includes an upper end portion when in use, and at least one weakened structure is located on the liquid bladder closed to the upper end portion. In a later stage of battery use, due to an action of gravity, an electrolyte shortage or even a depletion is more likely to occur on the upper end portion of the battery. Such a design enables to easily replenish the electrolyte from the upper portion of the battery cell to avoid the local electrolyte depletion.

In some embodiments, the liquid bladder includes at least one first liquid bladder and at least one second liquid bladder, and the first liquid bladder holds the another electrolyte, the second liquid bladder does not hold the another electrolyte, and the first liquid bladder and the second liquid bladder are isolated from each other in an initial state. In such a design, the second liquid bladder plays a role of buffering the space, which increases an adjustment space of the liquid bladder to the expansion pressure of the core assembly.

In some embodiments, the liquid bladder includes a first weakened structure provided between the first liquid bladder and the second liquid bladder for isolating them from each other, and when the pressure in the first liquid bladder reaches a first threshold value, the another electrolyte in the first liquid bladder breaks through the first weakened structure and flows into the second liquid bladder. By providing the first weakened structure isolated between the first liquid bladder and the second liquid bladder, the another electrolyte is enabled to flow into the second liquid bladder after breaking through the first weakened structure, so as to provide a stepped expansion pressure adjustment capacity.

In some embodiments, a second weakened structure is further provided on the second liquid bladder, and when the pressure in the second liquid bladder reaches a second threshold value, the another electrolyte in the second liquid bladder breaks through the second weakened structure and flows out of the second liquid bladder. By further providing the second weakened structure on the second liquid bladder, when the first liquid bladder is extruded, the another electrolyte inside first enters the second liquid bladder, and when further extruded, the another electrolyte breaks through the second weakened structure and flows from the second liquid bladder, so as to automatically replenish the electrolyte in the housing.

In some embodiments, at least one second liquid bladder is located in an area of the two end portions of the core assembly. In this way, a height space between an end cover and the core assembly of the end portion of the core assembly may be effectively used. Such a design is beneficial under the condition of increasing requirements for battery energy density.

In some embodiments, the second liquid bladder is located in an area not provided with a tab at the upper end portion of the core assembly. The end portion of the core assembly is usually provided with the tab, but the tab does not occupy an entire height space between the end cover and the core assembly, so as to make the second liquid bladder be located in the area not provided with a tab at the upper end portion of the core assembly, and this portion of area may be further used.

In some embodiments, the liquid bladder further includes at least one buffer bladder and a third weakened structure provided between the first liquid bladder and the second liquid bladder, the first weakened structure isolates the first liquid bladder and the buffer bladder, and the third weakened structure isolates the buffer bladder and the second liquid bladder, and when the pressure in the buffer bladder reaches a third threshold value, the another electrolyte in the buffer bladder breaks through the third weakened structure and flows into the second liquid bladder. By providing the buffer bladder between the first liquid bladder and the second liquid bladder, and using the first weakened structure and the third weakened structure to isolate between them, the liquid bladder is further provided with the stepped expansion pressure adjustment capacity.

In some embodiments, at least one buffer bladder is at least one channel spaced apart from each other, one end of each channel is provided with the first weakened structure, and the other end of each channel is provided with the third weakened structure. Providing the buffer bladder as at least one channel spaced apart may prevent the deterioration of battery performance caused by a large change of an interface contact position when the weakened structure is broken through by the another electrolyte.

In some embodiments, when the buffer bladder includes a plurality of the channels, a volume of each channel is the same or different. The position, stress, temperature and environmental factors of each core assembly in the housing affect a use degree and an expansion pressure of the core assembly. Correspondingly, the volume of each channel is configured to be the same or different, so that a buffer space provided by each channel may be the same or different, so as to provide a fine expansion pressure adjustment capacity for the liquid bladder.

In some embodiments, when the liquid bladder includes a plurality of the first weakened structures, the first threshold value of each first weakened structure is same or different; in some embodiments, when the liquid bladder includes a plurality of the second weakened structures, the second threshold value of each second weakened structure is same or different; and in some embodiments, when the bladder includes a plurality of the third weakened structures, the third threshold value of each third weakened structure is same or different.

When the plurality of first threshold values, the plurality of second threshold values, and the plurality of third threshold values are the same value respectively, under the condition that the liquid bladder is extruded, the buffer space may be released uniformly at a position of each weakened structure at the same time, and the another electrolyte is released uniformly to the position of each weakened structure in the housing, this is beneficial for the rapid release of the buffer space and the rapid replenishment of the.

When the plurality of first threshold values, the second threshold values or the third threshold values are the different values respectively, or when the threshold values of some weakened structures are the same and the threshold values of some weakened structures are different, under the condition that the liquid bladder is extruded, the buffer space may be released step by step with a degree of extrude, and the another electrolyte is gradually released into the housing, so as to avoid the deterioration of battery performance caused by excessive change and ensure that the performance of the core assembly tends to a consistent level under different positions and temperature conditions.

In some embodiments, the first weakened structure includes at least one thinned area and/or at least one interlayer portion provided on the first liquid bladder; in some embodiments, the second weakened structure includes at least one thinned area and/or at least one interlayer portion provided on the second liquid bladder; and in some embodiments, the third weakened structure includes at least one thinned area and/or at least one interlayer portion provided on the second liquid bladder. Each weakened structure may be implemented in a flexible manner, which may be the thinned area located on the liquid bladder, and this manner has a simple manufacturing process; or may be an interlayer of different materials provided on the liquid bladder, as long as a stressed weakened structure may be formed.

In some embodiments, the first threshold value, the second threshold value, and the third threshold value are each independently within a range between 0.1 MPa and 2.0 MPa. A pressure threshold value of the weakened structure is provided in this range, so that when the pressure in the liquid bladder reaches this threshold value, the another electrolyte will break through the weakened structure and enter the buffer space or flow out of the liquid bladder to relieve the expansion pressure of the core assembly, so as to avoid an adverse effect on battery performance caused by excessive expansion of the core assembly.

In a second aspect, the present application provides a battery, which includes the battery cell in the above embodiments.

In a third aspect, the present application provides a power consumption apparatus, which includes the battery in the above embodiments, and the battery is configured to provide electrical energy.

The above description is only a summary of the technical solutions of the embodiments of the present application. In order to understand the technical means in the present application more clearly, it may be implemented in accordance with the content of the specification; and in order to make the above and other objectives, features and characteristics of the present application more obvious and easy to understand, the specific embodiments of the present application are cited below.

BRIEF DESCRIPTION OF DRAWINGS

Various other advantages and benefits will become apparent to those of ordinary skilled in the art upon reading the following detailed description of the preferred embodiments. The drawings are for a purpose of illustrating preferred embodiments only and are not to be considered limiting of the present application. Also, the same components are denoted by the same reference numerals throughout the drawings. In the drawings.

Figure 1:
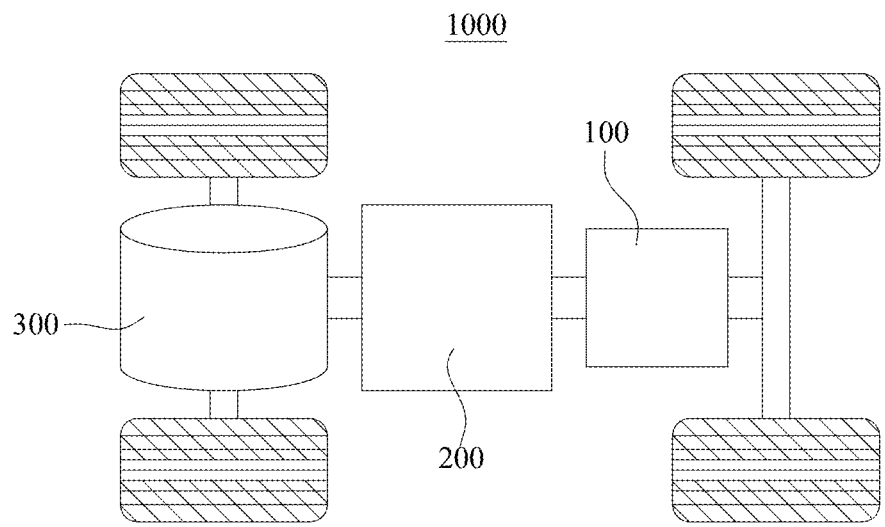
FIG. 1 is a schematic structural diagram of a vehicle according to some embodiments of the present application.

Reference numerals of the drawings in the specific embodiments are as follows:
vehicle 1000;
battery 100, controller 200, motor 300;
box body 10, first portion 11, second portion 12;
battery cell 20, end cover 21, electrode terminal 21a, housing 22, core assembly 23, tab 23a, liquid bladder 24, weakened structure 25; and
first liquid bladder 241, second liquid bladder 242, buffer bladder 243, channel 243a, first weakened structure 251, second weakened structure 252, third weakened structure 253.

DESCRIPTION OF EMBODIMENTS

Embodiments of the technical solutions of the present application will be described below in detail with reference to the drawings. The following embodiments are merely used to illustrate the technical solutions of the present application more clearly, and are therefore only used as examples, but may not be used to limit the protection scope of the present application.

Unless otherwise defined, all technological and scientific terms used herein have the same meanings as those commonly understood by those skilled in the art to which the present application belongs. The terms used in the specification herein are merely for the purpose of describing specific embodiments, but are not intended to limit the present application. The terms "including" and "having" and any variations thereof in the specification and the claims of the present application as well as the drawings described above are intended to cover non-exclusive inclusion.

In the description of the embodiments of the present application, the technical terms "first", "second" and the like are merely used to distinguish different objects, and shall not be understood as an indication or implication of relative importance or implicit indication of the quantity, a specific order or a primary-secondary relationship of indicated technical features. In the descriptions in the present application, unless otherwise explicitly and specifically defined, "a plurality of" means more than two.

The phrase "embodiments" referred to herein means that specific features, structures, or characteristics described in conjunction with the embodiments may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

In the description of the embodiments of the present application, the term "and/or" is only an association relation describing associated objects, which means that there may be three relations, for example, A and/or B may represent three situations: A exists alone, both A and B exist, and B exists alone. In addition, the character "/" herein generally indicates that the associated objects before and after the character are in an "or" relationship.

In the description of the embodiments of the present application, the term "a plurality of" refers to two or more (including two). Similarly, "a plurality of groups" refers to two or more groups (including two groups), and "a plurality of sheets" refers to two or more sheets (including two sheets).

In the description of the embodiments of the present application, the technical terms "center", "longitude", "transverse", "length", "width", "thickness", "up", "down", "front", "rear", "left", "right", "vertical", "horizontal", "top", "bottom", "inside", "outside", "clockwise", "counterclockwise", "axial direction", "radial direction" and "circumferential direction" are orientations or positional relationships shown based on the drawings, and are merely for convenience of describing the embodiments of the present application and for simplifying the description, but not for indicating or implying that an indicated apparatus or element must have a specific orientation, and must be constructed and operated in a specific orientation, which thus may not be understood as limiting the present application.

In the description of the embodiments of the present application, unless otherwise explicitly specified and defined, the technical terms such as "mounting", "connecting", "connection" and "fix" should be understood in a broad sense, for example, they may be a fixed connection, a detachable connection, or an integrated connection; they may be a mechanical connection, or may be an electrical connection; they may be a direct connection and may also be an indirect connection via an intermediate medium, they may be communication between the interiors of two elements or may be the interaction relationship between two elements. Those of ordinary skill in the art may appreciate the specific meanings of the foregoing terms in the embodiments of the present application according to specific circumstances.

At present, judging from the development of the market situation, the application of a power battery is becoming more and more extensive. The power battery is not only used in energy storage power systems such as hydraulic, thermal, wind and solar power stations, but also widely used in electric vehicles such as electric bicycles, electric motorcycles, electric automobiles, as well as military equipment, aerospace and other fields. With the continuous expansion of the application field of the power battery, the market demand is also constantly expanding.

The inventor has noticed that as a positive electrode active material and a negative electrode active material intercalate or desorb ions in a charge-discharge cycle of the battery, a side reaction stacking thickness of a battery core system and a peeling of a graphite sheet will cause the battery core to bulge, that is, a positive electrode sheet and a negative electrode sheet expand outward. The expansion of an electrode sheet has an adverse effect on the performance and service life of the battery, for example, a forced extrude may reduce a porosity of the electrode sheet and affect an infiltration of the electrode sheet by the electrolyte, so as to cause a change of an ion transmission path and bring a problem of lithium precipitation; and when the electrode sheet is subjected to a larger extrusion force for a long time, it may also break and cause a risk of short circuit in the battery, etc. In addition, the electrolyte may also be continuously consumed in the charge-discharge cycle of the battery, after the battery core is used for a certain period of time, a local electrolyte depletion may even occur, and the bulging of the battery core will further aggravate the situation of local electrolyte shortage.

In order to alleviate the problem of an expansion force of the battery core, the applicant has found through research that an expansion space may be reserved for the battery core in design. Specifically, a group margin of the battery core in a battery housing is reduced, that is, a percentage of a battery core thickness in the battery to the thickness of an inner cavity in the housing is reduced. For example, in a battery designed with a low group margin, an in-housing group margin of the battery core in a thickness direction is usually below 88.5%, and a full group margin is usually below 97%. However, in an initial state of the battery designed with the low group margin, the problem of wrinkling of the battery core may occur due to a large interspace in the housing. For example, the wrinkling of the positive electrode sheet may cause a path change of a lithium ion at a positive electrode interface, so as to bring the risk of lithium precipitation and affect the performance and life of the battery.

Based on the above considerations, in order to solve the problem of the deterioration of the battery core performance and the problem of electrolyte shortage caused by using the low group margin design considering the expansion force of the battery core during the use of the battery core, after in-depth research, the inventor designed a battery cell, by arranging at least one closed liquid bladder in the housing of the battery cell, and providing the liquid bladder at least corresponding to the side wall of the core assembly, the another electrolyte is held in the liquid bladder, and the weakened structure is provided on the liquid bladder, so that when the pressure in the liquid bladder reaches a threshold value, the another electrolyte may break through the weakened structure and flow out of the liquid bladder.

In such a battery cell, since the liquid bladder is provided corresponding to the side wall of the core assembly, the liquid bladder may be enabled to occupy an empty space in the housing in the thickness direction of the core assembly at an initial stage of battery cell use, and it is equivalent to increasing an equivalent group margin of the battery cell, which may effectively avoid the problem of wrinkling of the electrode sheet of the core assembly in the battery with the low group margin design.

Along with the charge-discharge cycle of the battery cell during the use, when the core assembly bulges, the liquid bladder provided corresponding to the side wall of the core assembly will be extruded and deformed. Due to the influence of factors such as stress difference and temperature environment difference on the battery core assemblies in different positions in the battery cell, the expansion force between the battery core assemblies is also different, the liquid bladder may be extruded and deformed to varying degrees according to the actual expansion pressure of each core assembly, so as to realize an adaptive adjustment of the expansion pressure of the core assembly.

Against the background of increasing demand for battery energy density, the battery cell of the present application may fully use an inner space of the housing as an expansion force buffer space of the core assembly. For example, a middle position of the core assembly is usually more seriously bulged than the two ends, and the expansion force is also larger. In this case, the inner of the liquid bladder is extruded and deformed, the portion corresponding to the middle of the side wall of the core assembly becomes thinner, and the another electrolyte is extruded into buffer space at two ends, which may relieve the expansion force in the middle portion of the core assembly and avoid the further deterioration of the battery performance and the risk of lithium precipitation.

With the further use of the core assembly and the further increase of the expansion force, the liquid bladder is further extruded, and when the pressure in the liquid bladder is extruded to reach the threshold value, the another electrolyte will break through the weakened structure on the liquid bladder and flow out of the liquid bladder, enter the housing and replenish the another electrolyte loss in the battery cell housing to realize an effect of automatic liquid replenishment. It should be noted that the another electrolyte in the liquid bladder may be the same as the initial electrolyte in the housing, or may be different electrolytes. For example, the another electrolyte in the liquid bladder may be a special electrolyte for the used core assembly, or other functional electrolytes.

The battery cell disclosed in the embodiments of the present application may be used, but not limited to, in electrical devices such as vehicles, ships, or aircraft. It is possible to use the battery cell, battery, etc. disclosed in the present application to form the power supply system of the power consumption apparatus. In this way, it is beneficial to alleviate and automatically adjust the deterioration of the expansion force of the battery core, replenish the electrolyte consumption, and improve the stability of battery performance and battery life.

The embodiment of the present application provides a power consumption apparatus using a battery as a power source, and the power consumption apparatus may be, but is not limited to, mobile phones, tablets, notebook computers, electric toys, electric tools, electromobiles, electric automobiles, ships, spacecrafts, and the like. Where the electric toys may include fixed or mobile electric toys, such as game consoles, electric vehicle toys, electric ship toys and electric airplane toys; and the spacecrafts may include airplanes, rockets, space shuttles, spaceships, and the like.

In the following embodiments, for the convenience of description, a vehicle 1000 is taken as an example to illustrate a power consumption apparatus according to an embodiment of this application Please refer to FIG. 1, FIG. 1 is a schematic structural diagram of a vehicle 1000 provided by some embodiments of the present application. The vehicle 1000 may be a fuel-powered vehicle, a gas-powered vehicle or a new energy vehicle, and the new energy vehicle may be a pure electric vehicle, a hybrid vehicle or an extended-range vehicle, etc. An interior of a vehicle 1000 is provided with a battery 100, and the battery 100 may be provided at the bottom, head or tail of the vehicle 1000. The battery 100 may be used for power supply of the vehicle 1000. For example, the battery 100 may serve as an operation power supply of the vehicle 1000. The vehicle 1000 may further include a controller 200 and a motor 300. The controller 200 is used to control the battery 100 to supply power to the motor 300, for example, for working power requirements during starting, navigating and driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
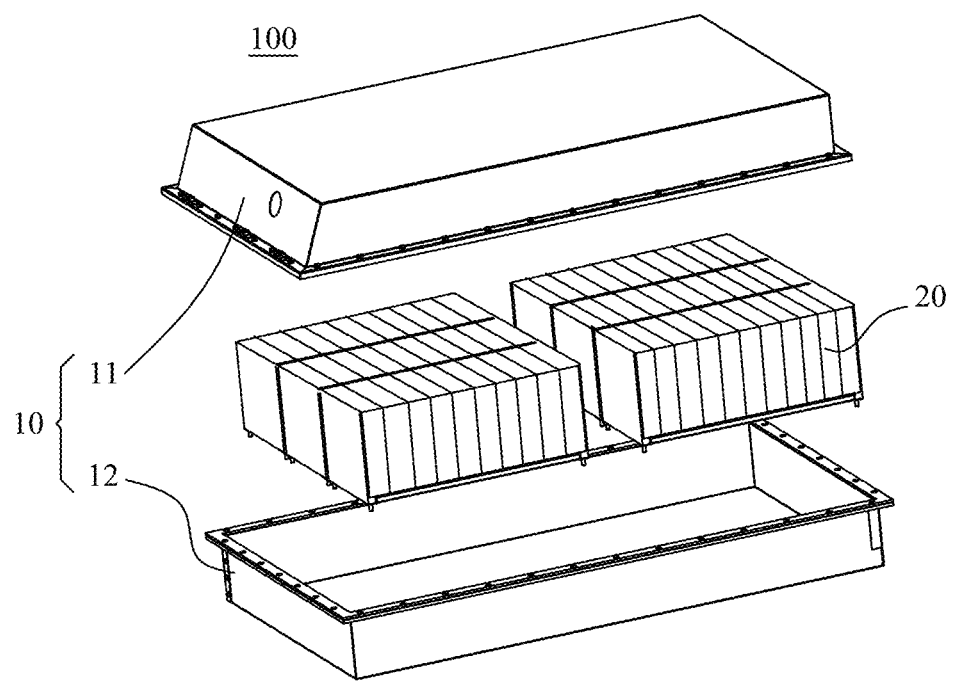
FIG. 2 is an exploded schematic structural diagram of a battery according to some embodiments of the present application.

Please refer to FIG. 2, FIG. 2 is an exploded diagram of a battery 100 provided by some embodiments of the present application. The battery 100 includes a box body 10 and a battery cell 20, and the battery cell 20 is accommodated in the box body 10. Where the box body 10 is configured to provide an accommodation space for the battery cell 20, and the box body 10 may adopt various structures. In some embodiments, the box body 10 may include a first portion 11 and a second portion 12, the first portion 11 and the second portion 12 are mutually covered, and the first portion 11 and the second portion 12 together define an accommodation space for accommodating the battery cell 20. The second portion 12 is a hollow structure with one end open, the first portion 11 may be a plate-like structure, and the first portion 11 covers an opening side of the second portion 12 so that the first portion 11 and the second portion 12 together define the accommodation space; and the first portion 11 and the second portion 12 may also be a hollow structure with one side open, and the opening side of the first portion 11 covers the opening side of the second portion 12. Of course, the box body 10 formed by the first portion 11 and the second portion 12 may have various shapes, such as a cylinder, a cuboid, etc.

In the battery 100, there may be a plurality of battery cells 20, the plurality of battery cells 20 may be connected in series or in parallel or in hybrid. The hybrid connection means that the plurality of battery cells 20 are both connected in series and in parallel. The plurality of battery cells 20 may be directly connected in series or in parallel or in hybrid, and then a whole formed by the plurality of battery cells 20 may be accommodated in the box body 10; of course, the battery 100 may also be the plurality of battery cells 20 first connected in series, or in parallel or in hybrid to form a battery module form, and a plurality of battery modules are connected in series or in parallel or in hybrid to form as a whole, and are accommodated inside the box body 10. The battery 100 may also include other structures, for example, the battery 100 may further include a bus component, and the bus component is configured to implement the electrical connection between the plurality of battery cells 20.

Among them, each battery cell 20 may be a lithium-ion secondary battery, a lithium-ion primary battery, a lithium sulfur battery, a sodium lithium-ion battery, or a magnesium-ion battery, but is not limited thereto. The battery cell 20 may be in the shape of a cylinder, a flat body or a cuboid, or in other shapes.

Figure 3:
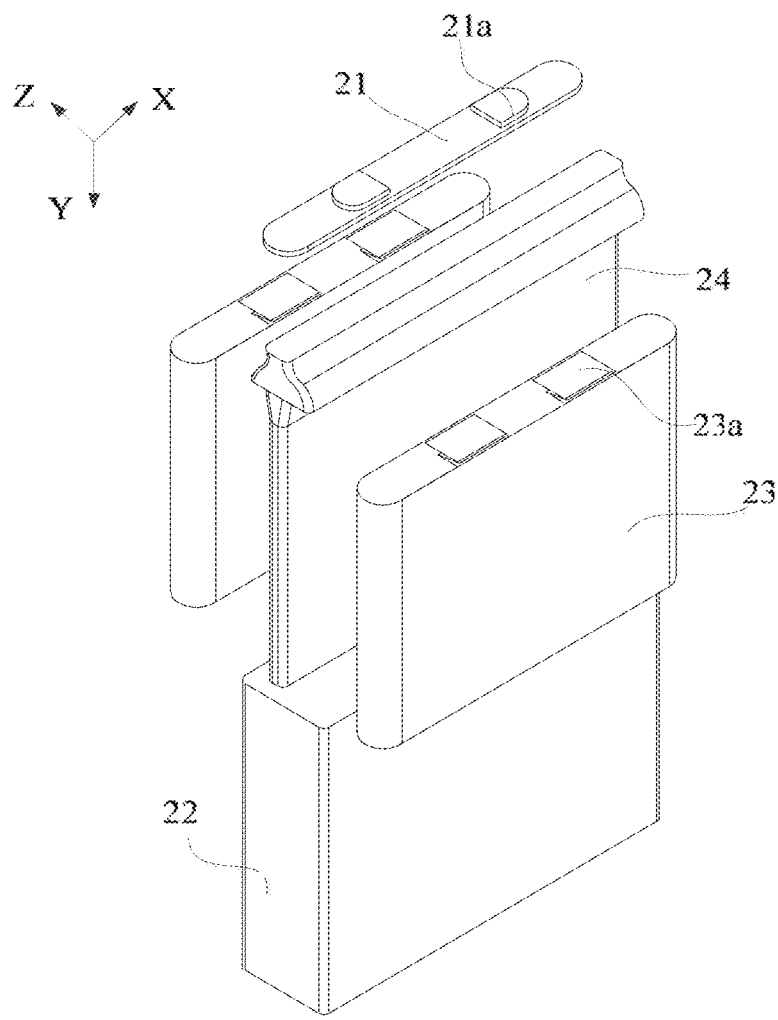
FIG. 3 is an exploded schematic structural diagram of a battery cell according to some embodiments of the present application.

Please refer to FIG. 3, FIG. 3 is an exploded schematic structural diagram of a battery cell 20 provided by some embodiments of the present application. The battery cell 20 refers to a smallest unit constituting the battery. As shown in FIG. 3, the battery cell 20 includes an end cover 21, a housing 22, a core assembly 23, a liquid bladder 24 and other functional components.

The end cover 21 refers to a component that covers the opening of the housing 22 to isolate the internal environment of the battery cell 20 from the external environment. Without limitation, a shape of the end cover 21 may be adapted to a shape of the housing 22 to cooperate with the housing 22. Optionally, the end cover 22 may be made of a material with a certain hardness and strength (such as aluminum alloy), so that the end cover 21 is not easy to deform when being extruded and collided, so that the battery cell 20 may have a higher structural strength and the safety performance may be improved. Functional components such an electrode terminal 21 a may be provided on the end cover 21. The electrode terminal 21 may be used for electrical connection with the core assembly 23 for outputting or inputting electrical energy of the battery cell 20. In some embodiments, the end cover 21 may also be provided with a pressure relief mechanism for releasing an internal pressure when the internal pressure or temperature of the battery cell 20 reaches the threshold value. The material of the end cover 21 may also be various, for example, copper, iron, aluminum, stainless steel, aluminum alloy, plastic, etc., which is not particularly limited in the embodiment of the present application. In some embodiments, an insulating member may also be provided on the inner side of the end cover 21, and the insulating member may be configured to isolate the electrical connection components in the housing 22 from the end cover 21, so as to reduce the risk of short circuit. Illustratively, the insulating member may be plastic, rubber, or the like.

The housing 22 is an assembly configured to cooperate with the end cover 21 to form an internal environment of the battery cell 20, where the formed internal environment may be configured to accommodate the core assembly 23, the electrolyte and other components. The housing 22 and the end cover 21 may be independent components, and an opening may be provided on the housing 22, and the end cover 21 may be made to cover the opening at the opening to form the internal environment of the battery cell 20. Without limitation, the end cover 21 and the housing 22 may also be integrated. Specifically, the end cover 21 and the housing 22 may first form a common connection surface before other components are put in the housing, and when it is necessary to seal the interior of the housing 22, the end cover 21 is made to cover the housing 22. The housing 22 may have various shapes and sizes, such as rectangular shape, cylindrical shape, hexagonal prism and the like. Specifically, the shape of the housing 22 may be determined according to a specific shape and size of the core assembly 23. The material of the housing 22 may be various, for example, copper, iron, aluminum, stainless steel, aluminum alloy, plastic, etc., which is not particularly limited in the embodiments of the present application.

The core assembly 23 is a component in the battery cell 100 in which an electrochemical reaction occurs. The housing 22 may contain one or more battery core assemblies 23. The core assembly 23 is mainly formed by winding or stacking the positive electrode sheet and the negative electrode sheet, and an isolation film is usually provided between the positive electrode sheet and the negative electrode sheet. The portions of the positive electrode sheet and the negative electrode sheet with an active material constitute a main body portion of the core assembly, and the portions of the positive electrode sheet and the negative electrode sheet without the active material constitute a tab 23a respectively. The positive electrode tab and the negative electrode tab may be located at one end of the main body portion together or at two ends of the main body portion respectively. During a charge-discharge process of the battery, the positive active material and the negative active material react with the electrolyte, and the tab 23a is connected to the electrode terminal to form a current loop.

The liquid bladder 24 is a closed bladder holding the another electrolyte inside, and may be deformed when it is extruded. In order to adapt to the use environment inside the battery and to facilitate sealing, the liquid bladder 24 should be formed using a non-conductive packaging material with corrosion resistance and adhesion. For example, a functional composite film or encapsulation material containing an outer protective layer and an inner sealing layer may be used. The outer protective layer is a corrosion-resistant insulating material, which may be suitable for the another electrolyte environment in the battery and adapt to the environment such as temperature and pressure of the battery in use. For example, the outer protective layer may be aluminum, Teflon, acrylic, polypropylene, and the like. The inner sealing layer may be, for example, a thermoplastic polyester film or a coating that facilitates package by a heat sealing process, such as polypropylene, polyvinyl chloride, polystyrene, acrylic resin, polycarbonate, polytetrafluoroethylene, polyurethane, and the like. In some embodiments, a closed liquid bladder 24 may be formed by heat sealing using an aluminum plastic film.

A weakened structure is provided on the liquid bladder 24, and the weakened structure has a lower strength than other positions on the liquid bladder 24, so that when the pressure in the liquid bladder 24 reaches the threshold value, the another electrolyte will break through the weakened structure and flow out of the liquid bladder 24 from a rupture at the weakened structure.

Figure 4:
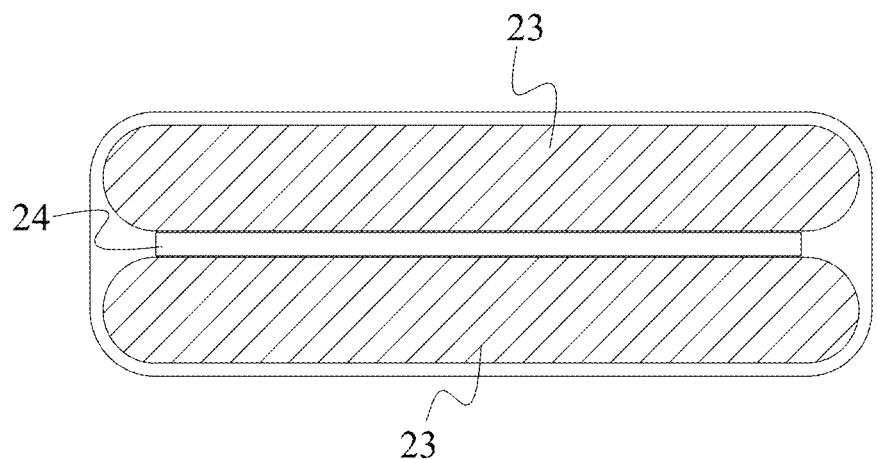
FIG. 4 is a cross-sectional schematic structural diagram of a battery cell taken along a Y direction according to some embodiments of the present application.
Figure 5:
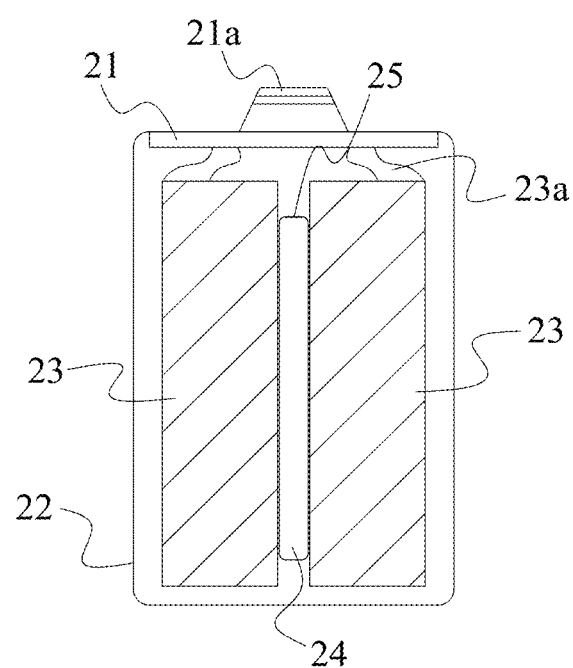
FIG. 5 is a cross-sectional schematic structural diagram of a battery cell taken along an X direction according to some embodiments of the present application.
Figure 6:
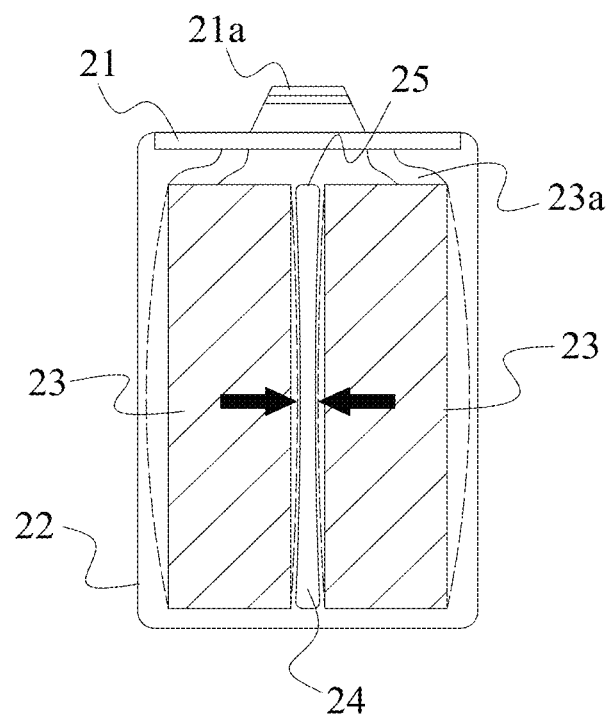
FIG. 6 is a cross-sectional schematic structural diagram of a battery cell taken along an X direction according to some embodiments of the present application, showing a state when a liquid bladder is extruded.
Figure 7:
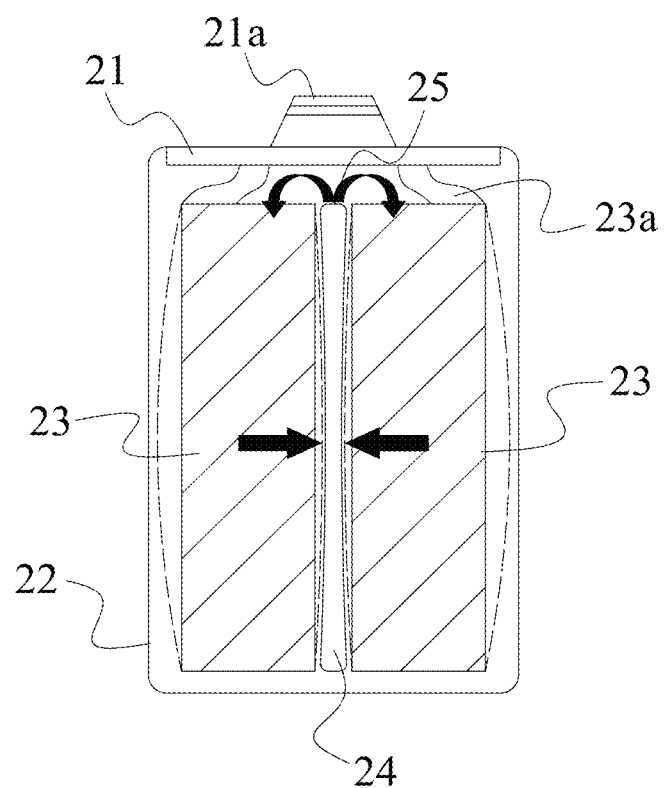
FIG. 7 is a cross-sectional schematic structural diagram of a battery cell taken along an X direction according to some embodiments of the present application, showing a state when a liquid bladder is extruded and an another electrolyte breaks through a weakened structure and flows out of the liquid bladder.

Please refer to FIG. 3 and further refer to FIG. 4 to FIG. 7. FIG. 4 is a cross-sectional schematic structural diagram of a battery cell taken along a Y direction according to some embodiments of the present application; and FIG. 5 to FIG. 7 are cross-sectional schematic structural diagrams of a battery cell taken along an X direction according to some embodiments of the present application, where FIG. 6 and FIG. 7 respectively shows the states when the liquid bladder is extruded and the another electrolyte breaks through the weakened structure and flows out of the liquid bladder.

As shown in the figures, the Y direction in the figures is the height direction of the core assembly 23. The tab 23a is located at the end of the core assembly 23 in the height direction, and are electrically connected to the electrode terminal 21a on the end cover 21. The housing 22 is filled with electrolyte; at least one core assembly 23 is arranged in the housing 22; the closed liquid bladder 24 is arranged in the housing 22, and the liquid bladder 24 holds the another electrolyte, and is at least arranged corresponding to the side wall of the core assembly 23; and at least one weakened structure 25 is arranged on the liquid bladder 24. When the pressure in the liquid bladder 24 reaches the threshold value, the another electrolyte in the liquid bladder breaks through the weakened structure 25 and flows out of the liquid bladder 24.

"The side wall of the core assembly 23" refers to an outer wall of the core assembly 23 in a direction parallel to the height direction (the Y direction in FIG. 3). The expansion force of the core assembly 23 is generally in a direction perpendicular to the height direction, so a bulging direction of the core assembly 23 mainly occurs in the side wall of a large surface (that is, the thickness direction, and the Z direction in FIG. 3) and a corner (that is, two ends in the width direction, and two ends in the X direction in FIG. 3). "The liquid bladder 24 is provided at least corresponding to the side wall of the core assembly 23" means that the liquid bladder 24 is arranged in the housing 22 and at least part of the liquid bladder 24 is in contact with the side wall of the core assembly 23.

By providing the liquid bladder 24 in the housing 22 to at least correspond to the side wall of the core assembly 23, the liquid bladder 24 may occupy the empty space between the side wall of the core assembly 23 and the side wall of the housing 22 in the initial stage of using the battery cell 100, and may play a supporting role for the core assembly 23, which may effectively avoid the problem of wrinkling of the core assembly 23. This is especially beneficial for the battery designed with a low group margin.

Referring to FIG. 6, as the use time of the core assembly 23 increases, when the side wall bulges, an extrusion force is generated on the liquid bladder 24 provided corresponding to the side wall of the core assembly 23, and an arrow direction in FIG. 6 is an extrusion force direction of the bulge of the core assembly 23 to the liquid bladder 24. The liquid bladder 24 will be deformed when extruded, and the position corresponding to the side wall of the core assembly 23 will become thinner, and the another electrolyte in the liquid bladder 24 will relatively gather in the area where the extrusion force is smaller. For example, in the figure, an end portion area of the liquid bladder 24 along the height direction of the core assembly 23 is used as a buffer space for the expansion force of the core assembly 23. At the same time, the internal pressure of the liquid bladder 24 increases, which produces a certain resistance and relief to the expansion force of the side wall of the core assembly 23. In this way, further deterioration of the expansion force of the core assembly 23 and the risk of lithium precipitation caused by extruding the electrode sheet may be avoided.

Referring to FIG. 7, as the use time of the core assembly 23 further increases, the expansion force further increases, and the degree of extruding the liquid bladder 24 further increases. When the internal pressure in the liquid bladder 24 reaches the threshold value, the weakened structure 25 is broken, the another electrolyte in the liquid bladder 24 flows out of the liquid bladder 24 from the rupture at the weakened structure 25, as shown by a curved arrow at the top in FIG. 7. In the battery cell 100 of the embodiment of the present application, by providing at least one weakened structure 25 on the liquid bladder 24, the another electrolyte in the liquid bladder 24 may be made to automatically replenishment the electrolyte loss in the housing 22 when the expansion force of the core assembly 23 reaches a certain degree.

According to some embodiments of the present application, optionally, please continue to refer to FIG. 5 to FIG. 7, the side wall of the core assembly 23 includes a middle side wall portion located in the middle area of two end portions of the core assembly 23, and at least part of the liquid bladder 24 is provided corresponding to the middle side wall portion of the core assembly 23. The middle side wall portion of the core assembly 23 is often the portion with the most severe bulging and the largest expansion force during the use of the battery core, so that at least part of the liquid bladder 24 is provided corresponding to the middle side wall portion, which may alleviate the expansion force of this portion of the core assembly 23, avoid the electrode sheet in the middle area of the core assembly 23 from being extruded greatly, and avoid the problem of lithium precipitation and the deterioration of battery performance caused thereby.

According to some embodiments of the present application, optionally, the liquid bladder 24 may be provided between the core assembly 23 and the side wall of the housing 22; and optionally, the liquid bladder 24 may also be provided between the adjacent battery core assemblies 23. The purpose of the present application may be achieved as long as at least one side of the liquid bladder 24 is in contact with the side wall of the core assembly 23 so that the liquid bladder 24 may be extruded when the core assembly 23 bulges due to use.

For example, at least a portion of the liquid bladder 24 may be provided between the side wall of the core assembly 23 and the side wall of the housing 22; in an embodiment in which two or more battery core assemblies 23 are arranged in the housing 22, at least a portion of the liquid bladder 24 may be provided between the side walls of the adjacent battery core assemblies 23, or may be provided between the side wall of the core assembly 23 and the side wall of the housing 22; and in an embodiment in which the core assembly 23 is cylindrical, at least a portion of the liquid bladder 24 may surround the side wall of the cylindrical core assembly 23 in a ring and be provided between the side wall of the core assembly 23 and the side wall of the housing 22. There may also be one or more liquid bladders 24. In an embodiment in which a plurality of liquid bladders 24 are arranged in the housing 22, and at least one liquid bladder 24 may also be provided between the side wall of the core assembly 23 and the side wall of the housing 22, or at least one liquid bladder 24 is provided between the side walls of the adjacent battery core assemblies 23. Optionally, a form in which the liquid bladder 24 is provided in the housing may be specifically interlayered between the side wall of the core assembly 23 and/or the side wall of the housing 11.

Figure 8:
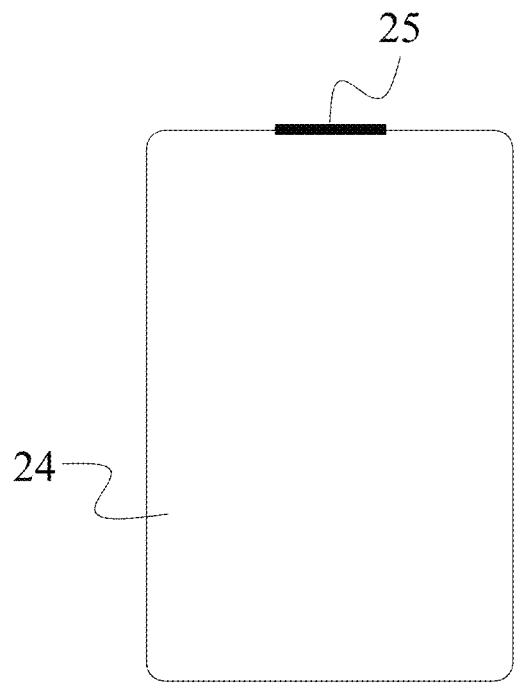
FIG. 8 is a schematic structural diagram of a liquid bladder in a battery cell according to some embodiments of the present application.

According to some embodiments of the present application, optionally, please refer to FIG. 8, FIG. 8 is a schematic structural diagram of a liquid bladder 24 in a battery cell 100 according to some embodiments of the present application. As shown in the figure, at least one weakened structure 25 is provided at at least part of the edge of the liquid bladder 24.

The edge of the liquid bladder 24 refers to the portion of the liquid bladder 24 that is not in contact with the side wall of the core assembly 23 or the side wall of the housing 22. For example, in an embodiment in which the core assembly 23 is square and the liquid bladder 24 is provided between the side walls of the adjacent battery core assemblies 23, the edge of the liquid bladder 24 may include two ends of the liquid bladder 24 along the height direction of the core assembly 23 (such as the Y direction in FIG. 3), or two sides of the liquid bladder 24 along the width direction of the core assembly 23 (such as the X direction in FIG. 3). Therefore, the edge of the liquid bladder 24 is located in a gap between the adjacent battery core assemblies 23 or in a gap between the core assembly 23 and the housing 22, and is not in contact with the core assembly 23 or the side wall of the housing 22. The weakened structure 25 is provided at at least part of the edge of the liquid bladder 24 so that when the liquid bladder 24 is extruded and the internal pressure reaches the threshold value, the another electrolyte may break through the weakened structure 25 located at the edge of the liquid bladder 24 and easily flow out from the edge of the liquid bladder 24 and is not blocked by the side wall of the core assembly 23 or the side wall of the housing 22, and is more convenient to replenishment the electrolyte consumption in the housing 22 from the gap of the side wall of the core assembly 24.

According to some embodiments of the present application, optionally, the battery cell 100 includes an upper end portion when in use, and at least one weakened structure 25 is located on the liquid bladder 24 closed to the upper end portion. Due to an action of gravity, an electrolyte shortage or even a local depletion is more likely to occur on the upper end portion of the battery cell 100 when in use. The weakened structure 25 is provided on the liquid bladder 24 closed to the upper end portion, so that when the another electrolyte in the liquid bladder 24 breaks through the weakened structure 25, the liquid bladder 24 flows out from the upper end portion of the battery cell 100, and replenishment the electrolyte in the housing 22 to avoid the risk of the local electrolyte depletion. Related to a placement direction of the battery cell 100 when in use, the upper end portion of the battery cell 100 when in use may be the end close to the end cover 21 or the other end opposite to the end where the end over 21 is located, and it may also be the upper end portion along the thickness direction of the core assembly 23, and the like.

Figure 9:
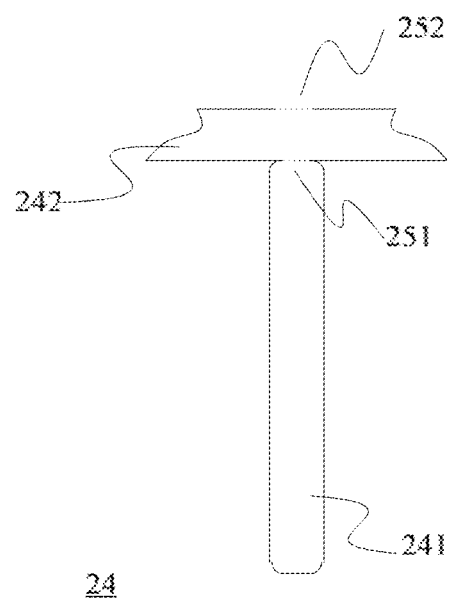
FIG. 9 is a schematic structural diagram of a liquid bladder in a battery cell according to some embodiments of the present application.

According to some embodiments of the present application, optionally, please refer to FIG. 9, FIG. 9 is a schematic structural diagram of a liquid bladder in a battery cell 100 according to some embodiments of the present application. As shown in the figure, the liquid bladder 24 may include at least one first liquid bladder 241 and at least one second liquid bladder 242, the first liquid bladder 241 holds the another electrolyte, the second liquid bladder 242 does not hold the another electrolyte, and the first liquid bladder 241 and the second liquid bladder 242 are isolated from each other in an initial state.

Since the first liquid bladder 241 holds the another electrolyte, the second liquid bladder 242 isolated from the first liquid bladder 241 does not hold the another electrolyte. Such a design enables the second liquid bladder 242 hardly occupy the space in the housing 22 in the initial state; after the first liquid bladder 241 is extruded by the side wall of the core assembly 23, the another electrolyte in the first liquid bladder 241 enters the second liquid bladder 242, therefore, the second liquid bladder 242 is equivalent to play a role of buffering the space. Equivalently, by providing the position of the second liquid bladder 242 in the housing 22, the another electrolyte in the liquid bladder 24 may be guided to gather to this position when it is extruded, which improves the utilization rate of the space in the housing 22 of the battery cell 100. For example, the position of the second liquid bladder 242 may be provided in any empty space in the housing 22 as required, and may be provided as a specific shape according to the actual situation. This is particularly beneficial under the condition of today's increasing requirements for battery energy density.

According to some embodiments of the present application, optionally, please refer to FIG. 9 again, FIG. 9 is a schematic structural diagram of a liquid bladder 24 in a battery cell 100 according to some embodiments of the present application. As shown in the figure, the liquid bladder 24 includes a first weakened structure 251 that may be provided between the first liquid bladder 241 and the second liquid bladder 242 for isolating them from each other, and when the pressure in the first liquid bladder 241 reaches a first threshold value, the another electrolyte in the first liquid bladder 241 breaks through the first weakened structure 251 and flows into the second liquid bladder 242, realizing a primary buffer of the expansion force of the core assembly 23. By providing the first weakened structure 251 isolated between the first liquid bladder 241 and the second liquid bladder 242, the another electrolyte is enabled to flow into the second liquid bladder 242 after breaking through the first weakened structure 251, so as to realize a secondary buffer of the expansion force of the core assembly 23. In this way, the battery cell 100 may be provided with a stepped expansion pressure adjustment capacity.

According to some embodiments of the present application, optionally, please refer to FIG. 9 again, a second weakened structure 252 may be further provided on the second liquid bladder 242, and when the pressure in the second liquid bladder 242 reaches a second threshold value, the another electrolyte in the second liquid bladder 242 breaks through the second weakened structure 252 and flows out of the second liquid bladder 242. By providing the second weakened structure 252 on the second liquid bladder 242, it may be convenient for the another electrolyte to flow out from the second weakened structure 252 on the second liquid bladder 242 to replenishment the another electrolyte loss in the housing 22.

Of course, in other embodiments, the second weakened structure 252 for supplying the another electrolyte to flow out may not be provided on the second liquid bladder 242, only another weakened structure for supplying the another electrolyte to flow out of the liquid bladder 24 is provided on the first liquid bladder 241, so that with the increase of the extrusion degree of the liquid bladder 24, the another electrolyte inside the first liquid bladder 241 first flows into the second liquid bladder 242, and then flows out of the weakened structure provided on the first liquid bladder 241 into the housing 22. Or in other embodiments, when the second weakened structure 252 is provided on the second liquid bladder 242, another weakened structure for the another electrolyte to flow out of the liquid bladder 24 may also be provided on the first liquid bladder 241 at the same time, so that the another electrolyte may flow out of the liquid bladder 24 from the second weakened structure 252 and another weakened structure located on the first liquid bladder 241 at the same time, so as to improve a rehydration rate of the liquid bladder 24 to the housing 22.

Figure 10:
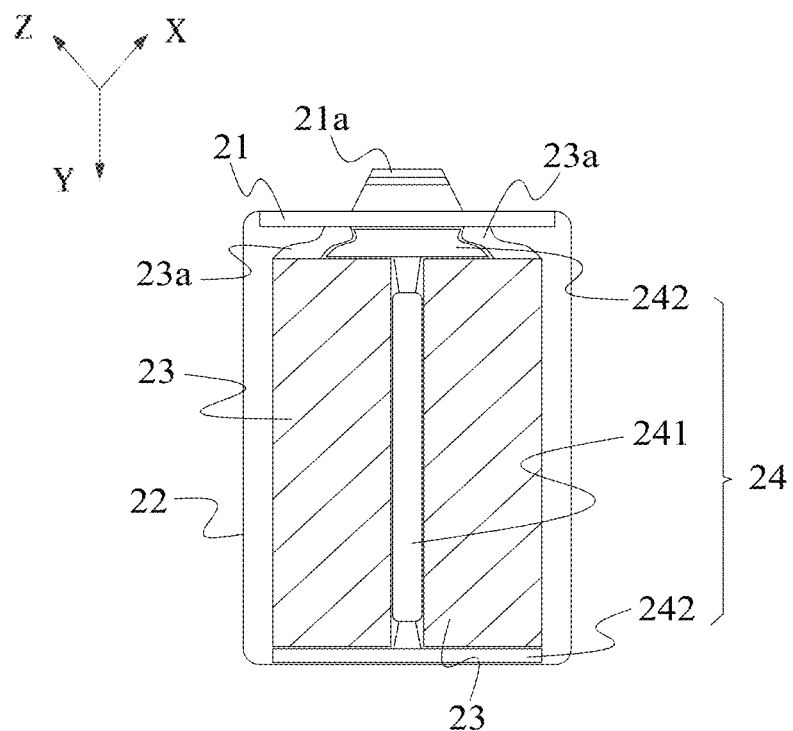
FIG. 10 is a cross-sectional schematic structural diagram of a battery cell taken along an X direction according to some embodiments of the present application.

According to some embodiments of the present application, optionally, please refer to FIG. 10, it is a cross-sectional schematic structural diagram of a battery cell 100 taken along a X direction according to some embodiments of the present application. As shown in the figure, at least one first liquid bladder 241 is provided between the battery core assemblies 23, and at least one second liquid bladder 242 is located in an area of two end portions of the core assembly 23. In the end portion area of the core assembly 23, there is usually an empty space. For example, in a height space between the end cover 21 and the core assembly 23, in addition to the space occupied by the tab 23a, there is also some empty space not occupied by the tab 23a; or there is also a certain empty space between the bottom of the core assembly 23 and the bottom of the housing 22, which is often difficult to use. In the present application, by arranging the second liquid bladder 242 in the end portion area of the core assembly 23, the height empty space at the end portion of the core assembly 23 may be effectively used for the expansion force buffer space of the core assembly 23. The second liquid bladder 242 may be arranged at one end or two ends of the core assembly 23, may be at the end where the tab 23a is located, or may be at the other end where the tab 23a is not provided. As shown in FIG. 10, the second liquid bladder 242 extends from one end of an upper tab 23a of the core assembly to the tabs 23a of the battery core assemblies on two sides respectively to fill the space between the tab 23a, the housing 22 and the core assembly 23; and the liquid bladder 242 respectively extends to two sides of the core assembly 23 at one end of the core assembly 23 where the tab is not provided to fill the space between the other end of the battery core 23 and the housing 22.

Figure 11:
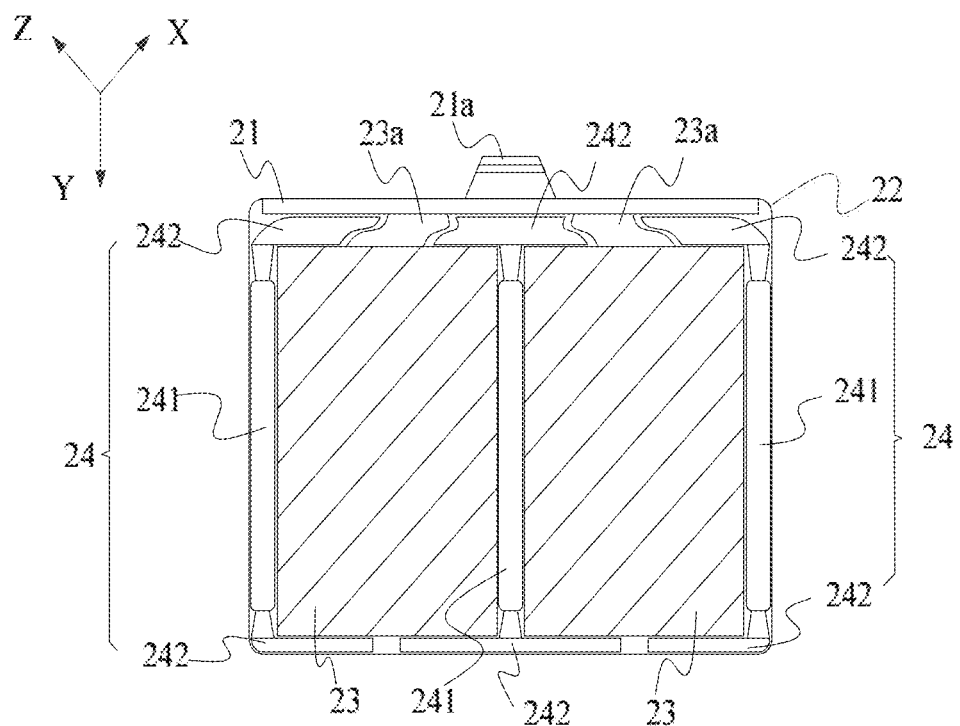
FIG. 11 is a schematic cross-sectional structural diagram of a battery cell taken along an X direction according to some embodiments of the present application.

According to some embodiments of the present application, optionally, please continue to refer to FIG. 11, it is a schematic cross-sectional structural view of a battery cell 100 taken along a X direction according to some embodiments of the present application. As shown in the figure, a first liquid bladder 241 is provided between the side wall of the core assembly 23 and the side wall of the housing 22, as well as between the battery core assemblies 23, and at least one second liquid bladder 242 may be located in the area of the upper end portion of the core assembly 23 where the tab 23a is not provided. When the second liquid bladder 242 is arranged at the upper end portion of the core assembly 23, especially at the end where the tab 23a is located, the shape of the second liquid bladder 242 may be designed to fill the space other than the space occupied by the tab 23a according to the shape of the tab 23a, so as to make full use of the space in the housing 22 of the battery cell 100, which is particularly beneficial to improve the battery energy density. As shown in FIG. 11, the second liquid bladder 242 is provided at the end portion of the core assembly 23 and at the corner of the side wall of the housing 22, and the shape of the second liquid bladder 242 is suitable for the structure of the space between the end portion of the core assembly 23 and the housing, the second liquid bladder 242 extends to the outside of the tab 23a at one end of the tab 23a on the core assembly to fill the space between the tab 23a and the side wall of the housing 22; and the end of the liquid bladder 242 on the core assembly 23 where the tab is not provided is used to fill the space between the other end of the battery core 23 and the housing 22. At the same time, the shape of the second liquid bladder 242 provided between the battery core assemblies 23 is suitable for the space structure between the end portions of the battery core assemblies 23, and the second liquid bladder 242 is at one end of the upper tab 23a of the core assembly, and extends to the outside of the tabs 23a of the battery core assemblies on two sides respectively to fill the space between the tab 23a, the housing 22 and the core assembly 23; and the end of the liquid bladder 242 on the core assembly 23 where the tab is not provided extends to two sides of the core assembly 23 respectively to fill the space between the other end of the battery core 23 and the housing 22.

Figure 12:
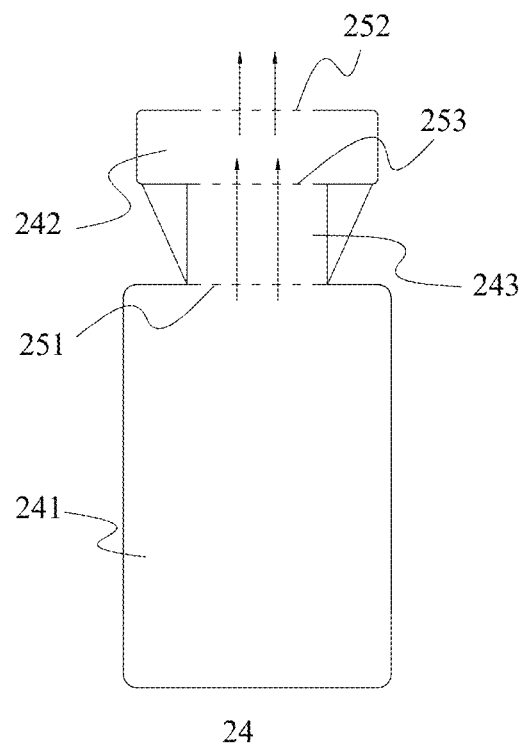
FIG. 12 is a schematic structural diagram of a liquid bladder in a battery cell according to some embodiments of the present application.

According to some embodiments of the present application, optionally, please refer to FIG. 12, FIG. 12 is a schematic structural diagram of a liquid bladder 24 in a battery cell 100 according to some embodiments of the present application. As shown in the figure, the liquid bladder 24 may further include at least one buffer bladder 243 and a third weakened structure 253 provided between the first liquid bladder 241 and the second liquid bladder 242. Where the first weakened structure 251 isolates the first liquid bladder 241 and the buffer bladder 243, and the third weakened structure 253 isolates the buffer bladder 243 and the second liquid bladder 242. When the pressure in the buffer bladder 243 reaches a third threshold value, the another electrolyte in the buffer bladder 243 breaks through the third weakened structure 253 and flows into the second liquid bladder 242. The buffer bladder 243 may provide a connection between the first liquid bladder 241 and the second liquid bladder 242, and the arrangement of the buffer bladder 243 is particularly beneficial when the second liquid bladder 242 is in the area of the end position of the core assembly 23. In addition, the first weakened structure 251 and the third weakened structure 253 are used to isolate the first liquid bladder 241, the second liquid bladder 242 and the buffer bladder 243, which further provides the core assembly 23 with a stepped expansion buffering capacity.

Figure 13:
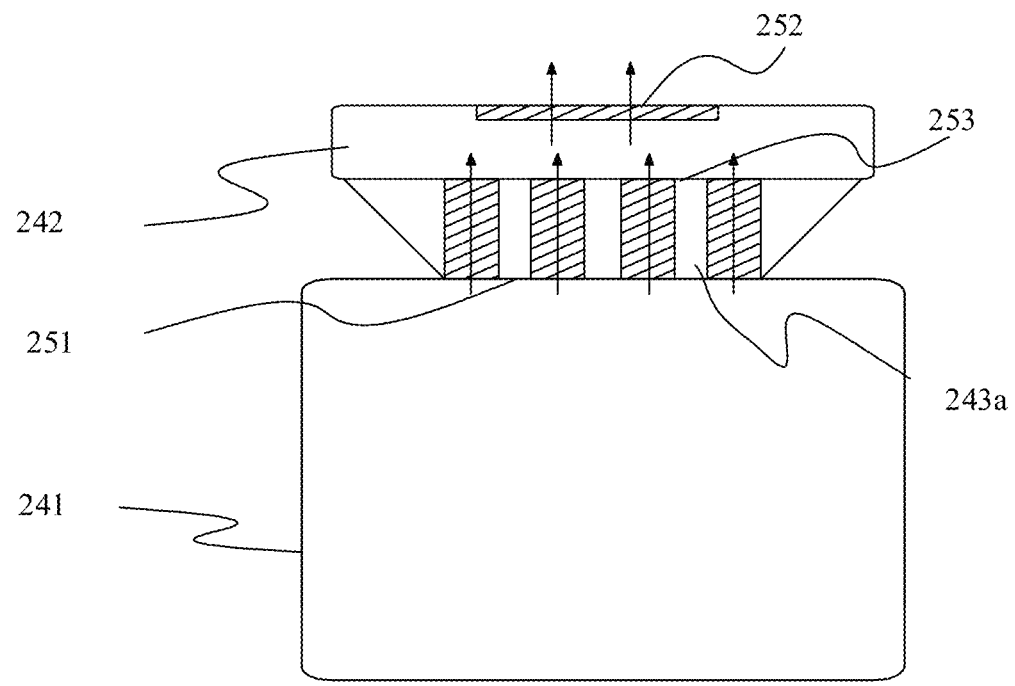
FIG. 13 is a schematic structural diagram of a liquid bladder in a battery cell according to some embodiments of the present application.

According to some embodiments of the present application, optionally, please refer to FIG. 13, FIG. 13 is a schematic structural diagram of a liquid bladder 24 in a battery cell 100 according to some embodiments of the present application. As shown in the figure, at least one buffer bladder 243 is at least one channel 243a spaced apart from each other, one end of each channel 243a is provided with the first weakened structure 251, and the other end of the channel 243a is provided with the third weakened structure 253. Providing the buffer bladder 243 as at least one channel 243a spaced apart may enable the battery cell 100 to break through different number of channels 243a according to the usage degree and expansion force change of the core assembly 23, so as to achieve adaptive adjustment and release the buffer space and internal electrolyte. Thus, it is ensured that the performance of the core assembly 23 tends to a consistent level in different positions and under different working conditions.

According to some embodiments of the present application, optionally, when the buffer bladder 243 includes a plurality of channels 243a, the volume of each channel 243a may be the same or different. Affected by the position, stress, temperature and environmental factors of the core assembly 23 in the housing 22, the use degree and expansion pressure of the core assembly may be different. Correspondingly, the volume of each channel 243a is configured to be the same or different, so that the buffer space provided by each channel 243a may be the same or different, so that the liquid bladder 24 may provide a fine expansion pressure adjustment capacity according to the use degree and expansion pressure of the core assembly 23 at different positions.

Figure 14:
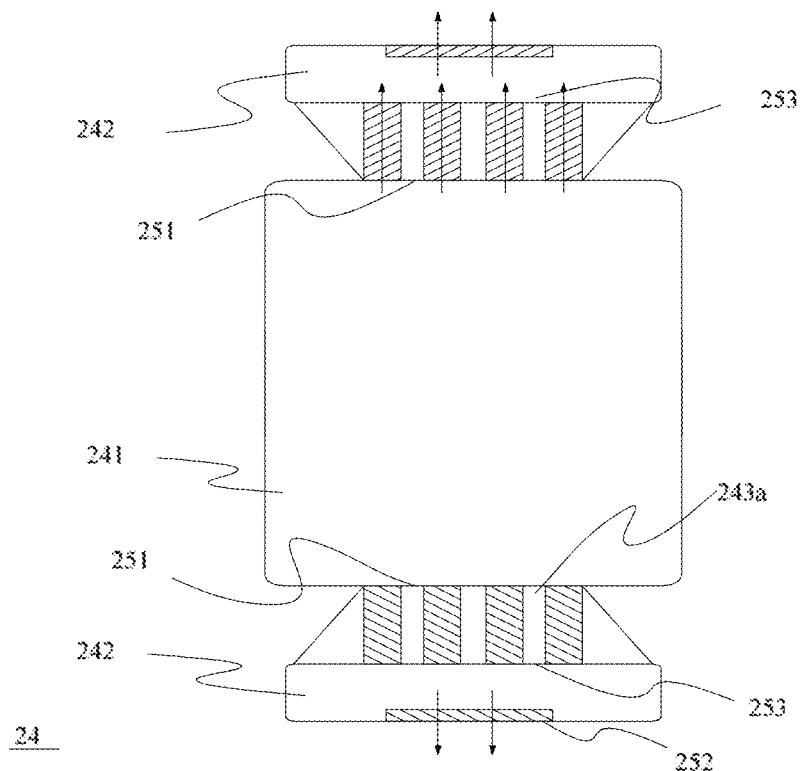
FIG. 14 is a schematic structural diagram of a liquid bladder in a battery cell according to some embodiments of the present application.

According to some embodiments of the present application, optionally, please refer to FIG. 14, FIG. 14 is a schematic structural diagram of a liquid bladder 24 in a battery cell 100 according to some embodiments of the present application. In the liquid bladder 24 shown in FIG. 14, the second liquid bladder 242 is respectively provided on two sides of the first liquid bladder 241, and the first weakened structure 251 is provided between the first liquid bladder 241 and the second liquid bladder 242, and when the pressure in the first liquid bladder 241 reaches the first threshold value, the another electrolyte in the first liquid bladder 241 breaks through the first weakened structure 251 on two sides of the first liquid bladder 241, and flows into the second liquid bladder 242 from two sides, realizing the primary buffer of the expansion force of the core assembly 23. By providing the second liquid bladders 242 on two sides of the first liquid bladder 241 respectively, when the internal pressure in the first liquid bladder 241 is too large, the pressure may be quickly released, and the rapid buffering of the expansion force of the core assembly 23 may be realized. Further, please continue to refer to FIG. 14, the second weakened structure 252 is respectively provided on each second liquid bladder 242, and when the pressure in the second liquid bladder 242 reaches the second threshold value, the another electrolyte in the second liquid bladder 242 breaks through the second weakened structure 252 and flows out of the second liquid bladder 242. By providing the second weakened structure 252 on the second liquid bladder 242, it is convenient for the another electrolyte to flow out from the second weakened structure 252 on the second liquid bladder 242 to replenishment the electrolyte loss in the housing 22.

According to some embodiments of the present application, optionally, please continue to refer to FIG. 14, a buffer bladder 243 and a third weakened structure 253 are respectively provided between the first liquid bladder 241 and each second liquid bladder 242. As shown in the figure, the first weakened structure 251 isolates the first liquid bladder 241 and the buffer bladder 243, and the third weakened structure 253 isolates the buffer bladder 243 and the second liquid bladder 242, and when the pressure in the buffer bladder 243 reaches the third threshold value, the another electrolyte in the buffer bladder 243 breaks through the third weakened structure 253 and flows into the second liquid bladder 242. Further, please continue to refer to FIG. 14, at least one buffer bladder 243 is at least one channel 243a spaced apart from each other, one end of each channel 243a is provided with the first weakened structure 251, and the other end of the channel is provided with the third weakened structure 253. The internal arrangement manner of the buffer bladder 243 may be the same or different, a channel is provided inside the buffer bladder 243 at one end, and no channel may be provided inside the buffer bladder 243 at the other end, which is not limited here. In the embodiment of the present application, by providing the buffer bladder 243 at two ends of the first liquid bladder 241, it may be well suitable for the situation that there are empty spaces at two ends of the battery core, and the buffer bladders 243 at two ends may well provide the each second liquid bladders 242 at two ends of the battery core.

According to some embodiments of the present application, optionally, when the liquid bladder 24 contains a plurality of first weakened structures 251, the first threshold value of each first weakened structure 251 may be the same. As the core assembly 23 expands in use, the pressure in the housing 22 will increase and generate an extrusion force on the liquid bladder 24, so that the pressure in the liquid bladder 24 also increases accordingly. When the pressure in the liquid bladder 24 reaches the first threshold value, the first weakened structure 251 is broken through by the another electrolyte in the liquid bladder 24, and the another electrolyte flows out of the liquid bladder 24 from the rupture of the first weakened structure 251. As the another electrolyte is released, the pressure in the liquid bladder 24 decreases until a balance is reached with the pressure in the housing 22. Providing the respective first threshold values of the plurality of first weakened structures 251 to be the same to make each of the first weakened structures 251 rupture at the same time and the another electrolyte flow out at the same time when the pressure in the liquid bladder 24 reaches the first threshold value, which may quickly relieve the expansion pressure of the core assembly 23 and quickly realize the replenishment of the electrolyte in the housing 22.

According to some embodiments of the present application, optionally, when the liquid bladder 24 contains a plurality of first weakened structures 251, the first threshold value of each first weakened structure 251 may also be different. By providing the first threshold value of each first weakened structure 251 to be different, each first weakened structure 251 may be broken gradually step by step with the expansion of the core assembly 23 and the increase of the pressure in the housing 22, the stepwise relief of the expansion pressure of the core assembly 23 and the gradual release of the another electrolyte may be realized, and by providing the specific position of each first weakened structure 251 and the value of each first threshold value, the fine adjustment of expansion pressure relief capacity and electrolyte replenishment may be realized.

The first threshold value of the first weakened structure 251 may also be in a range between 0.1 MPa and 2.0 MPa, which corresponds to the pressure range in the housing 22 of the battery cell 100 when in use.

Similarly, according to some embodiments of the present application, when the liquid bladder 24 includes the first liquid bladder 241 and the second liquid bladder 242, and the plurality of second weakened structure 252 is provided on the second liquid bladder 242, the second threshold value of each second weakened structure 252 may be the same or different. The second weakened structure 252 is provided on the second liquid bladder 242, and the second liquid bladder 242 does not hold the another electrolyte in the initial state. As the core assembly 23 expands in use, the pressure in the housing 22 may increase and generate the extrusion force on the first liquid bladder 241, so that when the pressure in the liquid bladder 241 increases to the first threshold value, the first weakened structure 251 is broken through by the another electrolyte in the first liquid bladder 241, the another electrolyte flows out of the first liquid bladder 241 from the rupture of the first weakened structure 251 and enters the second liquid bladder 242, and the pressure in the first liquid bladder 24 is released and reduced accordingly. With the further expansion of the core assembly 23, the first liquid bladder 241 and the second liquid bladder 242 are further extruded, the pressure in the second liquid bladder 242 reaches the second threshold value, and the another electrolyte entering the second liquid bladder 242 breaks through the second weakened structure 252, and the second liquid bladder flows out from the rupture of the second weakened structure 242. Providing the second threshold values of the plurality of second weakened structures 252 to be the same may speed up the expansion pressure relief capacity of the liquid bladder 24 to the core assembly 23 and realize the rapid replenishment of the electrolyte in the housing 22. By providing the second threshold values of the plurality of second weakened structures 252 to be different, the expansion pressure buffering capacity and electrolyte replenishment of the liquid bladder 24 may be finely adjusted by providing the specific position of the second weakened structure 252 and the value of each second threshold value.

Likewise, the second threshold value of the second weakened structure 252 may also be in a range between 0.1 MPa and 2.0 MPa, which corresponds to the pressure range in the housing 22 of the battery cell 100 when in use.

Similarly, according to some embodiments of the present application, when the liquid bladder 254 includes a plurality of the third weakened structures 253, the third threshold value of each third weakened structure 253 may be the same or different. The third weakened structure 253 is provided on the second liquid bladder 242, and spaced between the second liquid bladder 242 and the buffer bladder 243, and the second liquid bladder 242 and the buffer bladder 243 does not hold the another electrolyte in the initial state. As the core assembly 23 expands in use, the pressure in the housing 22 may increase and generate the extrusion force on the first liquid bladder 241, so that when the pressure in the liquid bladder 241 increases to the first threshold value, the first weakened structure 251 is broken through by the another electrolyte in the first liquid bladder 241, the another electrolyte flows out of the first liquid bladder 241 from the rupture of the first weakened structure 251 and enters the buffer bladder 243, and the pressure in the first liquid bladder 24 is released and reduced accordingly. With the further expansion of the core assembly 23, the first liquid bladder 241 and the buffer bladder 243 are further extruded, the pressure in the buffer bladder 243 reaches the third threshold value, and the another electrolyte entering the buffer bladder 243 breaks through the third weakened structures 253, and flows out of the buffer bladder from the rupture of the third weakened structure 243 and enters the second liquid bladder 242. Providing the third threshold values of the plurality of third weakened structures 253 to be the same may speed up the expansion pressure relief capacity of the liquid bladder 24 to the core assembly 23, and the another electrolyte may quickly enter the second liquid bladder 242. By providing the second threshold values of the plurality of third weakened structures 253 to be different, the expansion pressure buffering capacity of the liquid bladder 24 may be finely adjusted by providing the value of each second threshold value.

According to some embodiments of the present application, optionally, each weakened structure 25 may include a thinned area formed on the liquid bladder 24. For example, in an embodiment in which the liquid bladder 24 is formed by using an aluminum-plastic film, the weakened structure 25 may be obtained by thinning the aluminum-plastic film at a specific position, for example, by punching, ablating, heat sealing, etc. The weakened structure 25 has a lower pressure bearing capacity than other positions on the liquid bladder 24, so that when the pressure in the liquid bladder 24 increases, the weakened structure 25 formed in the thinned area is more easily broken through by the another electrolyte in the liquid bladder 24, so that the another electrolyte may flow out of the liquid bladder 24 from the rupture of the thinned area.

Figure 15:
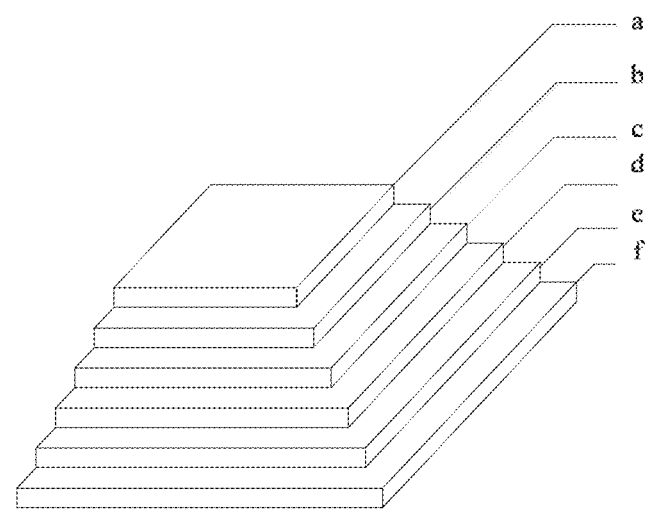
FIG. 15 is a schematic structural diagram of an interlayer material according to some embodiments of the present application.

According to some embodiments of the present application, optionally, each weakened structure 25 may weaken the strength of the heat seal by adjusting the heat sealing process and parameters (optional parameters: packaging temperature: 25~300° C., hot air pressure: 10~500 kgf, time 0.001~60 s) to form a weakened structure, and an additional interlayer portion may also be designed on the liquid bladder 24. The interlayer portion may be formed by providing the interlayer material at a specific location on the liquid bladder 24. The interlayer material may be a composite interlayer with a nylon layer and a CPP (Cast Polypropylene, cast polypropylene) layer, as shown in FIG. 15, the interlayer material includes a nylon layer a, an adhesive layer b, an aluminum foil layer c, and a protective layer d, adhesive layer e and CPP layer f. Where the nylon layer a is an outer protective layer, mainly to prevent the aluminum foil layer c from being scratched and play a role of protecting, and is generally polyhydric lactam; the adhesive layer b is configured to connect the nylon layer a and the aluminum foil layer c, and is generally an adhesive polymer layer, such as polyolefin resin, etc.; the aluminum foil layer c is a support layer, which mainly plays a role of sealing; the protective layer d is an inorganic salt functional coating, which may play a role of resisting electrolyte corrosion and resisting high temperature corrosion; the adhesive layer e plays a role of adhesive and may be a polyolefin adhesive; and the CPP layer is mainly used for heat sealing and is generally a polypropylene material.

The composite interlayer of the above nylon layer and the CPP layer is used as the composite material of the interlayer portion, so that the interlayer portion has a lower pressure bearing capacity than other positions of the liquid bladder 24. Therefore, when the pressure in the liquid bladder 24 increases, the weakened structure 25 formed by the heat bonding of the CPP layer is more likely to be broken through by the another electrolyte in the liquid bladder 24, so that the another electrolyte may flow out of the liquid bladder 24 from the rupture of the CPP layer of the two aluminum-plastic films.

Therefore, when the liquid bladder 24 includes the first liquid bladder 241 and the first liquid bladder 241 being provided with the first weakened structure 251, the first weakened structure 251 may include at least one thinned area, or at least one interlayer portion, or includes at least one thinned area and at least one interlayer portion at the same time. Correspondingly, when the second weakened structure 252 is provided on the second liquid bladder 242, the second weakened structure 252 may include at least one thinned area, or at least one interlayer portion, or includes at least one thinned area and at least one interlayer portion at the same time. Correspondingly, when the liquid bladder 24 includes the buffer bladder 243 and the second liquid bladder 242 is provided with the third weakened structure 253, the third weakened structure 253 may also include at least one thinned area, or at least one interlayer portion, or includes at least one thinned area and at least one interlayer portion at the same time.

Finally, it should be noted that each above embodiment is merely used for illustrating rather than limiting the technical solutions of the present application. Although the present application is illustrated in detail with reference to the foregoing embodiments, those of ordinary skill in the art should understand that they may still modify the technical solutions described in the foregoing embodiments, or make equivalent substitutions to some or all of the technical features therein, but these modifications or substitutions may be made to the respective technical solutions without departing from the scope of the technical solutions of the embodiments of the present application, which should be covered by the claims and the description of the present application. In particular, as long as there is no structural conflict, various technical features mentioned in the various embodiments may be combined in any manner. The present application is not limited to the specific embodiments disclosed herein, and includes all technical solutions falling within the scope of the claims.

The invention claimed is:

1. A battery cell, comprising:
 a housing, the housing being filled with an electrolyte inside;
 a core assembly arranged in the housing; and
 a closed liquid bladder holding another electrolyte, the closed liquid bladder being arranged in the housing and at least part of which is in contact with a side wall of the core assembly,
 wherein the closed liquid bladder comprises a first liquid bladder and a second liquid bladder, and the first liquid bladder holds the another electrolyte, the second liquid bladder does not hold the another electrolyte, and the first liquid bladder and the second liquid bladder are isolated from each other in an initial state,
 wherein a first weakened structure is provided between the first liquid bladder and the second liquid bladder for isolating them from each other, and when a pressure in the first liquid bladder reaches a first threshold value, the another electrolyte in the first liquid bladder breaks through the first weakened structure and flows into the second liquid bladder, and
 wherein a second weakened structure is provided on the second liquid bladder, and when a pressure in the second liquid bladder reaches a second threshold value, the another electrolyte flowed into the second liquid bladder breaks through the second weakened structure and flows out of the second liquid bladder.

2. The battery cell according to claim 1, wherein the side wall of the core assembly comprises a middle side wall portion located in a middle area of two end portions of the core assembly, and the closed liquid bladder is provided corresponding to the middle side wall portion.

3. The battery cell according to claim 1, wherein the closed liquid bladder is provided between the core assembly and a side wall of the housing, and/or, the closed liquid bladder is provided between adjacent core assemblies.

4. The battery cell according to claim 1, wherein the second weakened structure is provided at a part of an edge of the second liquid bladder.

5. The battery cell according to claim 4, wherein the second weakened structure comprises a plurality of second weakened structures, which are spaced apart at the part of the edge of the second liquid bladder.

6. The battery cell according to claim 1, wherein the battery cell comprises an upper end portion, the closed liquid bladder comprises an upper edge and a lower edge, and second weakened structure is located on a part of the upper edge of the second liquid bladder, the upper edge being closer to the upper end portion than the lower edge.

7. The battery cell according to claim 1, wherein the second liquid bladder is located in an area of two end portions of the core assembly.

8. The battery cell according to claim 1, wherein the second liquid bladder is located in an area not provided with a tab at an upper end portion of the core assembly.

9. The battery cell according to claim 1, wherein the closed liquid bladder further comprises a buffer bladder and a third weakened structure which are provided between the first liquid bladder and the second liquid bladder, the first weakened structure isolates the first liquid bladder from the buffer bladder, and the third weakened structure isolates the buffer bladder from the second liquid bladder, and when a pressure in the buffer bladder reaches a third threshold value, the another electrolyte in the buffer bladder breaks through the third weakened structure and flows into the second liquid bladder.

10. The battery cell according to claim 9, wherein the buffer bladder comprises a plurality of channels spaced apart from each other, one end of each of the plurality of channels is provided with the first weakened structure, and an other end of each of the plurality of channels is provided with the third weakened structure.

11. The battery cell according to claim 10, wherein a volume of each of the plurality of channels is same or different.

12. The battery cell according to claim 9, wherein
the closed liquid bladder comprises a plurality of first weakened structures, the first threshold value of each of the first weakened structures is same or different; and/or
the closed liquid bladder comprises a plurality of second weakened structures, the second threshold value of each of the second weakened structures is same or different; and/or
the closed liquid bladder comprises a plurality of third weakened structures, the third threshold value of each of the third weakened structures is same or different.

13. The battery cell according to claim 9, wherein
the first weakened structure comprises at least one thinned area and/or an interlayer portion provided on the first liquid bladder; and/or
the second weakened structure and the third weakened structure each independently comprises at least one thinned area and/or an interlayer portion provided on the second liquid bladder.

14. The battery cell according to claim 9, wherein the first threshold value, the second threshold value, and the third threshold value are each independently within a range between 0.1 MPa and 2.0 MPa.

15. A battery, comprising: a plurality of battery cells, wherein at least one of the plurality of battery cells is the battery cell according to claim 1.

16. A power consumption apparatus, the power consumption apparatus comprising the battery according to claim 15, and the battery being configured to provide electrical energy.

* * * * *